J. W. ROPP.
SEED FEEDING MECHANISM.
APPLICATION FILED NOV. 16, 1916.

1,243,631.

Patented Oct. 16, 1917.

WITNESSES

INVENTOR
JOHN W. ROPP,
BY
ATTORNEYS

UNITED STATES PATENT OFFICE.

JOHN WESLEY ROPP, OF CROSS HILL, SOUTH CAROLINA.

SEED-FEEDING MECHANISM.

1,243,631.   Specification of Letters Patent.   Patented Oct. 16, 1917.

Application filed November 16, 1916. Serial No. 131,664.

*To all whom it may concern:*

Be it known that I, JOHN W. ROPP, a citizen of the United States, and a resident of Cross Hill, in the county of Laurens and State of South Carolina, have invented a certain new and useful Improvement in Seed-Feeding Mechanism, of which the following is a specification.

My present invention relates generally to grain and fertilizer drills, and more particularly to a practical, efficient, and adjustable seed feeding or discharging mechanism, my object being to provide one including novel arrangements, coöperation, and adjustment of parts as hereinafter described, reference being made in the following specification of the several parts, to the accompanying drawings forming a part of this specification, and wherein—

Figure 2:
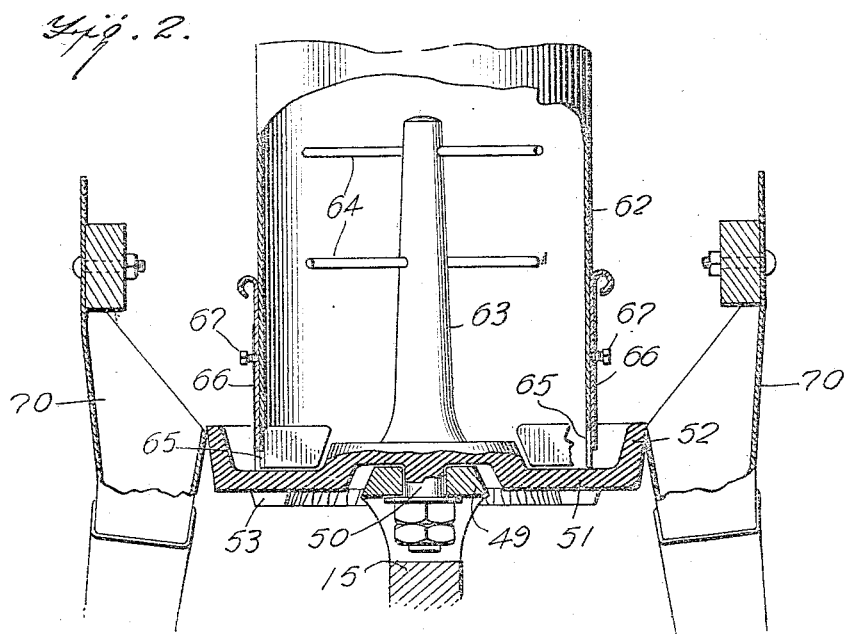
Fig. 2 is a vertical cross section taken substantially on line 2—2 of Fig. 1

Referring again to Fig. 2, it will be noted that a bearing bracket 49 is rigidly secured upon a support 15, which latter may be the draft beam of a planter, for the reception of the axially depending bolt or stub shaft 50 of the seed feeding cup 51 having an annular upstanding edge flange 52 and having a circular gear 53 upon its lower surface, the latter of which is adapted to be engaged by suitable mechanism for rotating the same.

The seed cup 51 is rotatable beneath the lower open ends of the vertical cylindrical seed hopper 62 and is provided with a central upright 63 projecting upwardly into the said hopper and provided with laterally projecting stirring arms 64 so as to assist in the feed from the lower end of the hopper, which takes place through lower side and rear openings 65, under the control of external vertically adjustable feed controlling plates 66, each of which has a set screw 67 by which it may be secured in selected vertical adjustment to the hopper 62.

Figure 1:
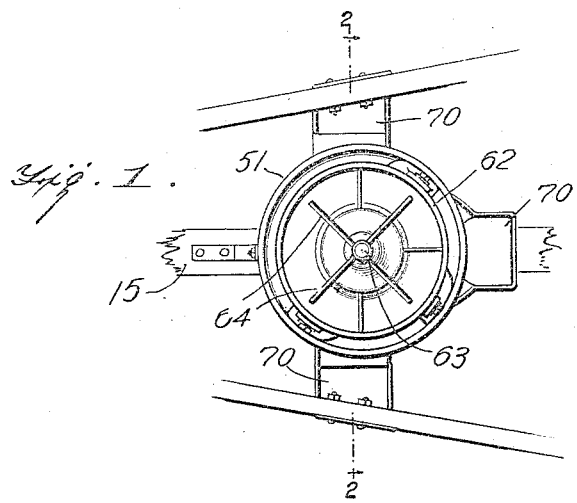
Figure 1 is a plan view of the parts included in my invention.

The hopper 62 is supported in position within the seed cup 51, in spaced relation to the annular flange 52 of the latter, by means of a forward rigid and upright bracket 68 secured to the support 15, as seen in Fig. 1, and by any other desired connections, so that the cup 51 forms a seed channel around the lower end of the hopper, receiving the seed through the hopper openings 65.

Figure 3:
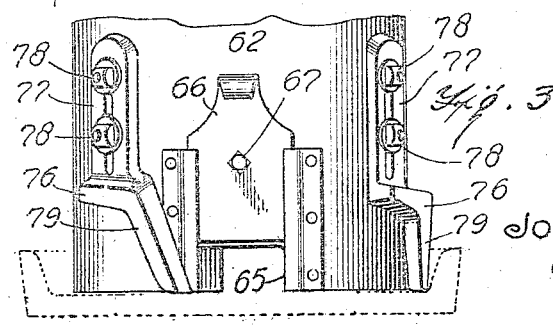
Fig. 3 is a detail side view of the lower portion of the hopper.

The feed chutes 70, of which there may be a plurality, have their upper ends opening at the sides of the seed cup 51, each opposite one of the openings 65 of the hopper 62, and adjacent the upper open ends of the seed chutes 70, the hopper 62 is provided with seed discharge members 76, best seen in Fig. 3, and each of which includes an upper longitudinally slotted portion 77 adjustably connected by bolts 78 extending from the hopper, and movable in the slot thereof, and a lower inclined portion 79 which projects downwardly into the seed channel of the cup 51 around the lower end of the hopper, so as to deflect the seeds therein in an upward direction over the edge of the seed cup 51 and into the upper open ends of the respective seed chutes, it being understood from the foregoing that the hopper itself is stationary while the cup 51 rotates with respect thereto and the parts carried thereby.

It is obvious that a machine so constructed has a wide range of use in its practical operation, and that it is, by virtue of the detachability, adjustment, and coöperation of the several parts as previously described, well adapted to many other uses in connection with soil preparation and planting not here specifically set forth, but reserved under the terms of the appended claims.

I claim:—

1. A machine of the class described including a support, a plurality of seed chutes adjacent the rear of the support, a distributing device above the support, and including a stationary hopper, a lower rotating seed cup having a flange surrounding the lower portion of the hopper in spaced relation to form a seed channel receiving seed from the lower portion of the hopper, and stationary inclined seed discharging members adjustable on the seed hopper adjacent the several seed chutes, and projecting at their lower ends into the said seed channel, for the purpose described.

2. In a machine of the class described, a seed feeding mechanism including a stationary hopper, a rotating seed cup below the hopper having a flange surrounding the lower end of the hopper in spaced relation to form a seed channel, a plurality of seed chutes having their upper ends terminating adjacent the flanged edge of the said seed cup at points spaced therearound, stationary seed discharging members secured to the hopper and depending into the said seed channel adjacent the several seed chutes, and adjustable seed feeding doors in the lower portion of the hopper also adjacent the several seed chutes, through which the seed may find its way into the said seed channel.

3. In a machine of the character described, the combination of a plurality of seed chutes, a stationary seed hopper, a rotary seed pan into which the hopper opens at certain points, and a plurality of seed discharging members adjustably fixed adjacent the seed chutes and inclined downwardly into the said seed pan.

4. In a machine of the class described, the combination of a plurality of seed chutes, a stationary seed hopper having seed discharge openings adjacent the upper ends of the said seed chutes, a rotary seed pan in which the seed hopper is disposed, and into which the seed from the hopper openings fall, and a plurality of seed discharging members adjustably fixed to the hopper adjacent the upper ends of the seed chutes, and inclined downwardly into the seed pan adjacent the said hopper openings.

5. In a machine of the class described, the combination of a plurality of seed chutes, a stationary seed hopper, a rotary seed pan in which the hopper is disposed, and a plurality of seed discharging members adjustably fixed adjacent the seed chutes and inclined downwardly into the seed pan, said hopper having a plurality of seed openings leading into the seed pan, and adjustable drawers adjacent the said openings of the hopper.

6. In a machine of the class described, the combination of a plurality of seed chutes, a stationary seed hopper, a rotary seed pan receiving the seed from the said hopper, and into which the latter is disposed, and a plurality of seed discharging members adjustably and removably fixed to the seed hopper and inclined downwardly into the said seed pan adjacent the said seed chutes.

JOHN WESLEY ROPP.

Witnesses:
C. J. HIPP,
H. N. CARTER.